(No Model.)

J. T. KAYLOR, J. W. McCOMB & W. T. DANIEL.
TIRE SHRINKER.

No. 458,172. Patented Aug. 25, 1891.

Witnesses.
H. Ruppert
H. A. Daniels

Inventors.
John T. Kaylor,
John W. McComb,
Wm. T. Daniel,
Per
Thomas P. Simpson.
Atty

UNITED STATES PATENT OFFICE.

JOHN T. KAYLOR, JOHN W. McCOMB, AND WILLIAM T. DANIEL, OF GRAHAM, ALABAMA.

TIRE-SHRINKER.

SPECIFICATION forming part of Letters Patent No. 458,172, dated August 25, 1891.

Application filed March 23, 1891. Serial No. 386,154. (No model.)

*To all whom it may concern:*

Be it known that we, JOHN T. KAYLOR, JOHN W. McCOMB, and WILLIAM T. DANIEL, citizens of the United States, residing at Graham, in the county of Randolph and State of Alabama, have invented certain new and useful Improvements in Tire-Shrinkers; and we do hereby declare the following to be a full, clear, and exact description of the invention, such as will enable others skilled in the art to which it appertains to make and use the same.

The special office of our invention is to connect a tire-shrinker with an anvil so that it may be quickly and easily applied thereto or removed therefrom, and whereby the shrinking of tires may be conveniently done by one man only by using a treadle mechanism, as hereinafter described.

Figure 1:
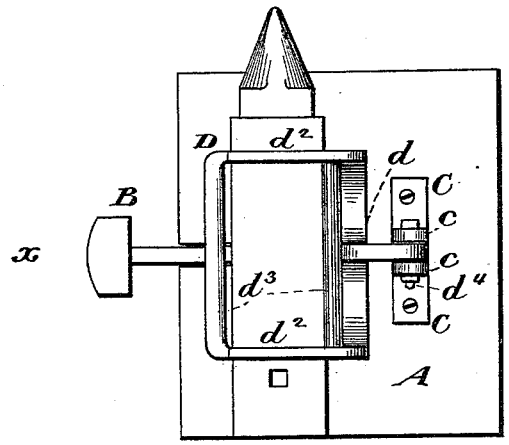
Figure 2:
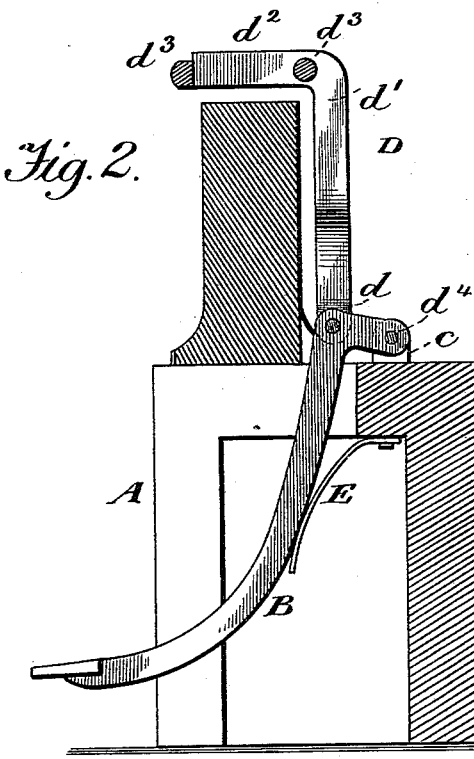
Figure 3:
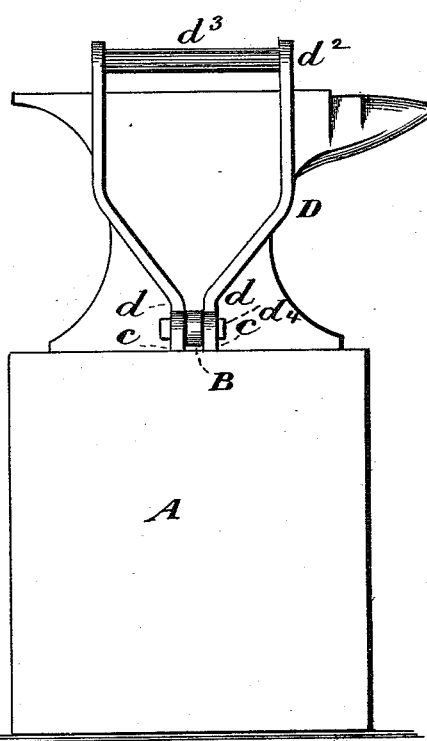

Figure 1 of the drawings is a plan view of the tire-shrinker connected with the anvil placed on a suitable block or platform; Fig. 2, a vertical section on the dotted line $x\,x$ of Fig. 1, and Fig. 3 a rear view in perspective.

In the drawings, A represents a block or platform slotted to permit the treadle B to work up and down therein, said treadle being pivoted between the ears $c\,c$ of two metallic straps C C, screwed or otherwise fastened on top of the anvil-block. The treadle B is an elbow-lever pivoted at the vertex of its angle to and between the lower ends of the arms $d\,d$ of the shrinker. The shrinker D has the right-angled bands $d'\,d'$ to form the tire-clamps $d^2\,d^2$, which are connected by the cross-bars $d^3\,d^3$. Under the treadle a spring E may be used to hold the clamp above the anvil, and when the tire has been arranged by the operator on the anvil as he wishes it to lie he puts his foot on the treadle and holds it while he proceeds to upset the metal.

The operation is as follows: The tire is first placed on the conical end of the anvil and bent to form a convexity extending beyond the ordinary circumference of the tire, and the latter is then clamped on the anvil, so as to bring this abnormal convexity within and above the open space of the clamp. The blacksmith then hammers on this convexity, which has been brought to a forging heat, until the tire is contracted to the desired degree.

The pivot $d^4$ is removable, so that the shrinker may be taken off the anvil.

By this method of using a tire-shrinker in connection with an anvil one man is able to do what is ordinarily the work of two men.

Having thus described all that is necessary to a full understanding of our invention, what we claim as new, and desire to protect by Letters Patent, is—

1. The combination, with an anvil, of a shrinker and treadle jointed together to hold the tire on the anvil, for the purpose set forth.

2. The combination, with an anvil and anvil-block, the latter having an elbow-lever treadle pivoted thereon, of the shrinker D, pivoted detachably to the treadle, whereby the anvil may be used with or without the shrinker, as described.

In testimony whereof we affix our signatures in presence of two witnesses.

JOHN T. KAYLOR.
JOHN W. McCOMB.
WILLIAM T. DANIEL.

Witnesses:
A. C. SAXON,
W. J. STEWART.